(12) United States Patent
Roeck

(10) Patent No.: US 7,581,220 B1
(45) Date of Patent: Aug. 25, 2009

(54) SYSTEM AND METHOD FOR MODIFYING USER MEMORY FROM AN ARBITRARY KERNEL STATE

(75) Inventor: Guenter E. Roeck, San Jose, CA (US)

(73) Assignee: Symantec Operating Corporation, Mountain View, CA (US)

(*) Notice: Subject to any disclaimer, the term of this patent is extended or adjusted under 35 U.S.C. 154(b) by 826 days.

(21) Appl. No.: 11/285,272

(22) Filed: Nov. 22, 2005

(51) Int. Cl.
*G06F 9/46* (2006.01)
(52) U.S. Cl. ............................ 718/100; 711/100
(58) Field of Classification Search .............. 718/100; 711/100
See application file for complete search history.

(56) References Cited

U.S. PATENT DOCUMENTS

| | | | | |
|---|---|---|---|---|
| 6,917,963 | B1 * | 7/2005 | Hipp et al. | 709/204 |
| 7,178,062 | B1 * | 2/2007 | Dice | 714/38 |
| 2005/0102396 | A1 * | 5/2005 | Hipp | 709/224 |
| 2006/0059486 | A1 * | 3/2006 | Loh et al. | 718/100 |

* cited by examiner

*Primary Examiner*—Andy Ho
(74) *Attorney, Agent, or Firm*—Meyertons, Hood, Kivlin, Kowert & Goetzel, P.C.; B. Noel Kivlin

(57) ABSTRACT

A system, method, and computer-accessible medium for modifying user memory from an arbitrary kernel state are disclosed. The kernel may generate a modification to the context of the process. Subsequently, the kernel may pass control to the process in user mode, and further, the process may pass control from the user mode to the kernel in response to the modification of the context of the process. The kernel may then modify the process memory from kernel mode.

20 Claims, 11 Drawing Sheets

SYSTEM AND METHOD FOR MODIFYING USER MEMORY FROM AN ARBITRARY KERNEL STATE

BACKGROUND

1. Field of the Invention

This invention relates to enterprise system management and, more particularly, to continuous availability techniques in multi-server networked environments.

2. Description of the Related Art

The impact of system downtime on productivity is increasing as organizations rely more heavily on information technology. Consequently, organizations may seem to minimize downtime through various approaches designed to increase reliability and availability. Ultimately, the goal of many organizations is to ensure the continuous availability of critical systems.

One approach to continuous availability is the use of redundant hardware executing redundant instances of an application in lockstep. If one instance of an application on one unit of hardware fails, then the instance on the other unit of hardware may continue to operate. However, the redundant hardware is often proprietary, and both the redundant and proprietary natures of the hardware yield a cost that may be prohibitive.

To avoid the expense of special-purpose hardware, software techniques may be used to provide failover of an application. For example, cluster management software may support application failover in a networked environment having two or more servers and a shared storage device. If the failure of an application or its host server is sensed, then a new instance of the application may be started on a functioning server in the cluster. However, software-based failover approaches may fail to preserve the entire context of the application instance on the failed server up to the moment of failure. In the wake of a failure, the new instance of the application is typically started anew. In the process, recent transactions and events may be discarded. Other transactions and events may be left in an indeterminate state. The server or its clients may need to initiate new connections to replace connections lost in the failover.

Debugging software has used techniques for the logging and replay of events encountered by an application. For example, a debugger may log events occurring during execution of a first instance of an application. The debugger may then replay the logged events from the beginning by means of instrumentation of the application, typically using recompilation or other techniques prior to replay. However, recompilation may not be available for off-the-shelf application software, and static instrumentation may often yield an unacceptable performance penalty for software in a production environment. Furthermore, replay of logged events may be performed inefficiently in a debugging context.

It is desirable to provide improved methods and systems for continuously available execution environments.

SUMMARY

A system, method, and computer-accessible medium are disclosed for modifying user memory from an arbitrary kernel state. In one embodiment, the state of a first instance of a computer program may be deterministically restored to a second instance by replaying the execution of the first instance of the computer program. In some instances of event playback, a process associated with the second instance of the program may require instrumentation or other modification for deterministic playback. The system, method, and medium disclosed herein may permit the efficient modification of user memory (e.g., process memory for a process executing in user mode) from substantially any kernel state.

In one embodiment, the method may include generating a modification to the context of the process from kernel mode. Subsequently, the method may include passing control to the process in user mode. The method may include passing control from the user mode back to kernel mode in response to the modification of the context of the process. In one embodiment, control may be passed from kernel mode to user mode and back to kernel mode in such a way that no instructions are executed in user mode. The method may further include modifying the process memory from kernel mode, such as by setting a breakpoint in the program instructions that implement the process or changing the values of variables or other elements of the process. The method may therefore transform an arbitrary kernel state (e.g., a CPU interrupt state) into a kernel state in which the program may be easily and efficiently manipulated. After modifying the program, the program may be restored to its original user context.

BRIEF DESCRIPTION OF THE DRAWINGS

A better understanding of the present invention can be obtained when the following detailed description is considered in conjunction with the following drawings, in which.

While the invention is described herein by way of example for several embodiments and illustrative drawings, those skilled in the art will recognize that the invention is not limited to the embodiments or drawings described. It should be understood that the drawings and detailed description thereto are not intended to limit the invention to the particular form disclosed, but on the contrary, the intention is to cover all modifications, equivalents and alternatives falling within the spirit and scope of the invention as defined by the appended claims.

DETAILED DESCRIPTION OF EMBODIMENTS

Figure 1:
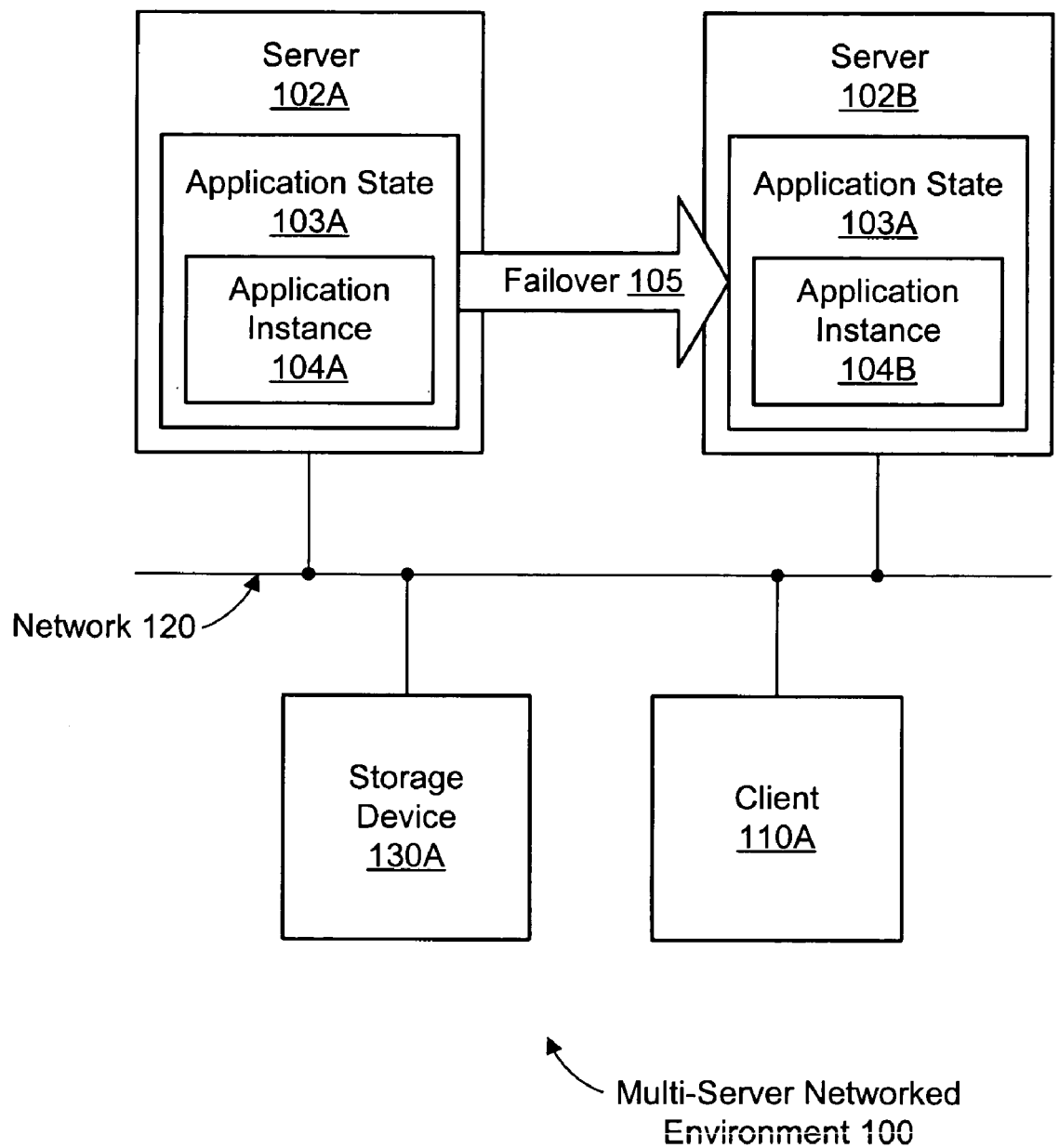
FIG. 1 illustrates a multi-server networked environment including failover according to one embodiment.
Figure 2:
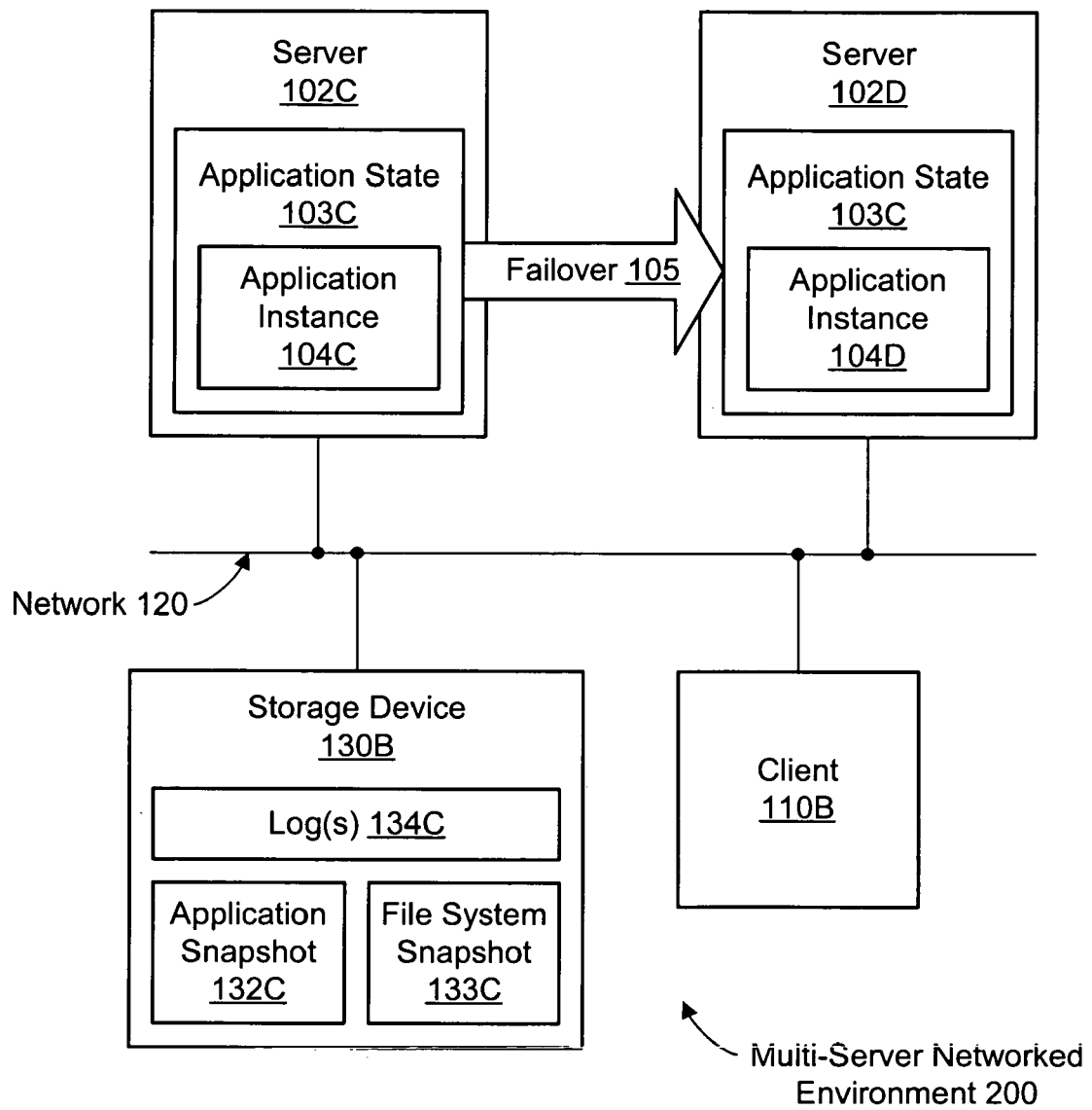
FIG. 2 illustrates a multi-server networked environment including failover based on capturing and restoring a file system snapshot, application snapshot, and log of events according to one embodiment.
Figure 4:
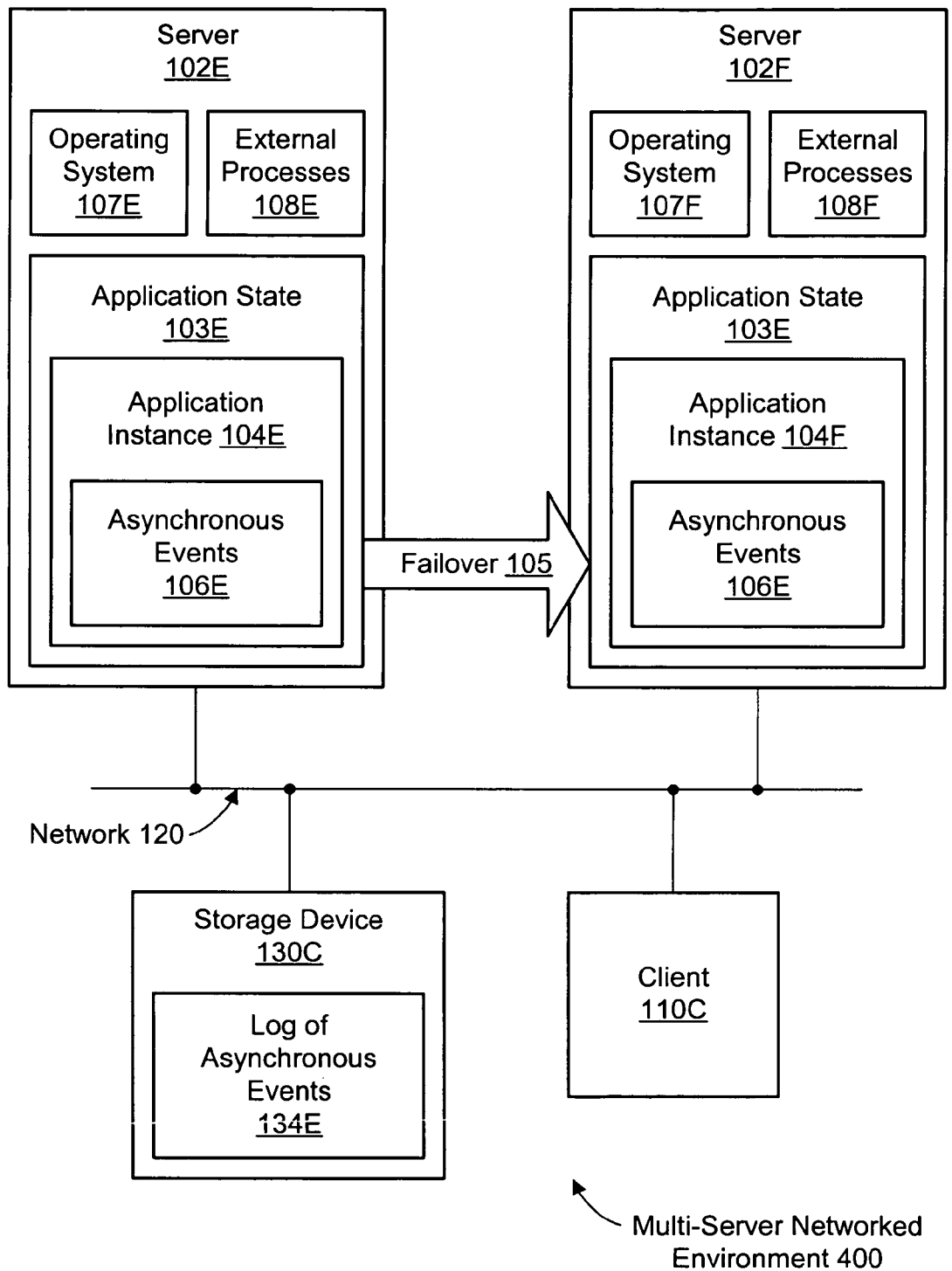
FIG. 4 illustrates a multi-server networked environment including failover based on logging and replaying asynchronous events according to one embodiment.
Figure 9:
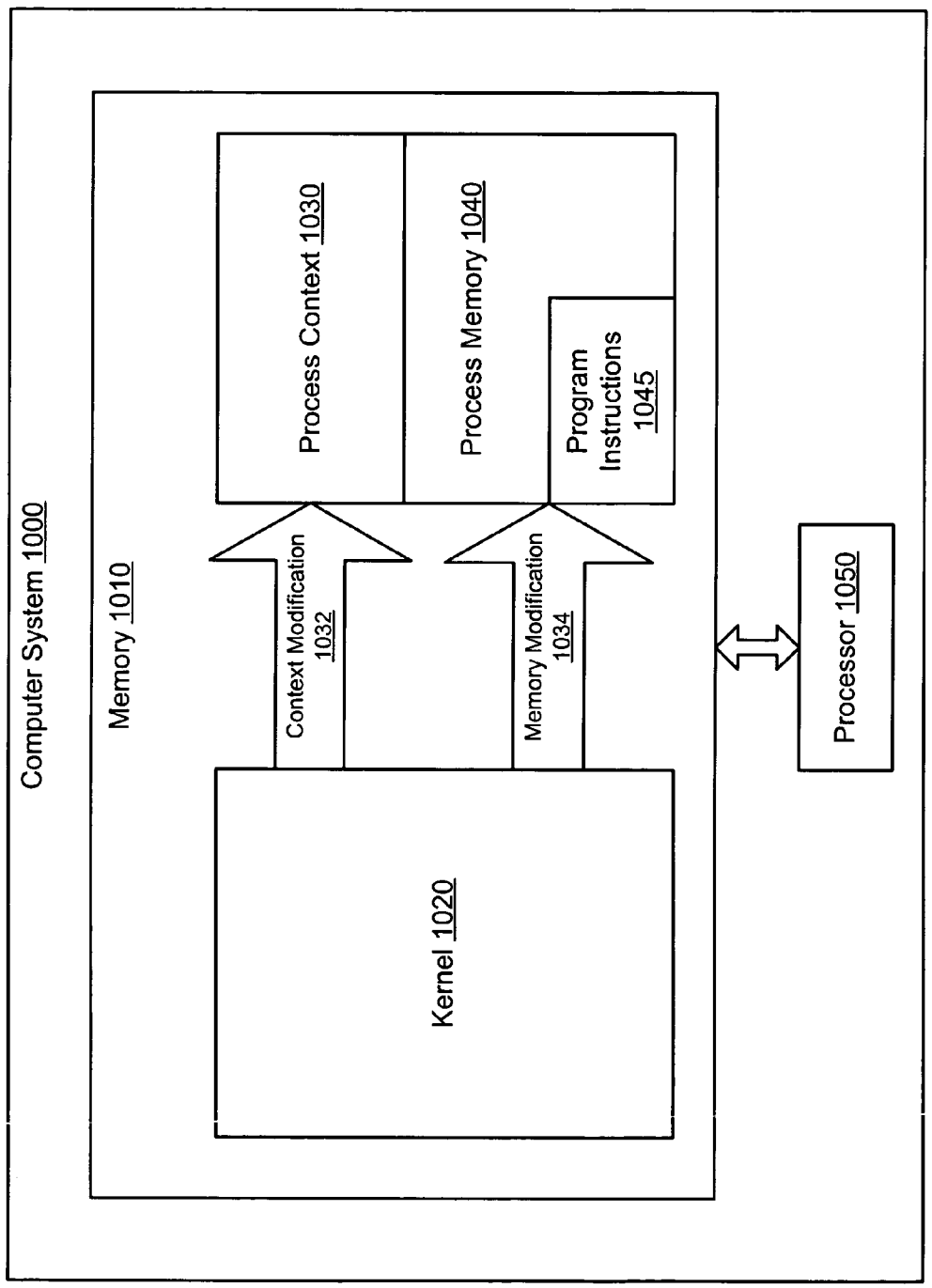
FIG. 9 illustrates a computer system including context and memory modification of a process according to one embodiment.

Using the systems, methods, and computer-accessible media described herein, efficient modification of user memory from an arbitrary kernel state may be provided. In capturing an application state of an instance of an application, events may be logged up to a point in time (e.g., a point of application failure). The application state up to the point in time may be deterministically restored to a second instance of the application by efficiently replaying the events. Execution of the application may resume from the point in time using the second instance. In some instances of application playback, a process associated with the second instance of the application may require modification for desired results, e.g., deterministic playback of the application. For example, it may be desirable to instrument or otherwise modify the process from any kernel state in which the kernel determines that such instrumentation is necessary and in a manner minimizing delay after such determination. FIGS. 1, 2, and 4 illustrate examples of multi-server networked environments which may be used with the systems, methods, and computer-accessible media described herein. FIG. 9 illustrates an example of a computer environment which may be used with the systems, methods, and computer-accessible media described herein. The example configurations shown in FIGS. 1, 2, 4, and 9 and the quantity and kind of elements shown therein, are intended to be illustrative rather than limiting, and other embodiments are possible and contemplated.

As used herein, the term "server(s)" or "servers(s) 102" may refer collectively to any of the servers 102A-102K illustrated in FIGS. 1, 2, and 4. Servers 102 may also be referred to herein as "hosts." As used herein, the term "client(s)" or "client(s) 110" may refer collectively to any of the clients 110A-110E illustrated in FIGS. 1, 2, and 4. As used herein, the term "storage device(s)" or "storage device(s) 130" may refer collectively to any of the storage devices 130A-130E illustrated in FIGS. 1, 2, and 4. As used herein, the term "application(s)" or "application(s) 104" may refer collectively to any of the application instances 104A-104F illustrated in FIGS. 1, 2, and 4. As used herein, the term "application state(s)" or "application state(s) 103" may refer collectively to any of the application states 103A, 103C, 103E illustrated in FIGS. 1, 2, and 4. As used herein, the term "multi-server networked environment(s)" may refer collectively to any of the multi-server networked environments 100, 200, 400, 1000, 1100 illustrated in FIGS. 1, 2, 4, 9, and 11. As used herein, the term "log(s)" or "log(s) 134" may refer collectively to any of the logs 134C, 134E, 134G, 134J illustrated in FIGS. 2 and 4. As used herein, the term "operating system(s)" or "operating system(s) 107" may refer collectively to any of the operating systems 107E, 107F illustrated in FIG. 4. As used herein, the term "external processes(s)" or "external processes(s) 108" may refer collectively to any of the external processes 108E, 108F illustrated in FIG. 4.

FIG. 1 illustrates a multi-server networked environment 100 including failover according to one embodiment. The multi-server networked environment 100 may be used to provide a continuously available execution environment including failover 105 for one or more applications 104. If one server 102A fails, the execution environment may be recreated on another server 102B such that the application state 103A immediately prior to the failure is duplicated. The application state 103A may include execution state, memory state, transaction state, open network connections, open files, and any other parameters and context necessary to resume execution of the application 104 in a deterministic manner. By duplicating the application state 103A of one application instance 104A to another application instance 104B using failover techniques 105, the application 104 may continue execution in a manner that is transparent to one or more clients 110.

The continuously available execution environment may also be referred to as "software fault tolerance" or "application virtualization." In one embodiment, applications may be encapsulated in a virtual environment in which exchanges of data with the operating system and with other external processes are monitored. The virtual environment may include the virtualization of network addresses, process IDs, thread IDs, semaphore IDs, and other addresses and identifiers which link the application to external resources. In one embodiment, the continuously available execution environment may be implemented primarily in software, i.e., without using redundant propriety hardware executing in lockstep. In one embodiment, the continuously available execution environment may be implemented without recompilation of an operating system kernel.

In one embodiment, the continuously available execution environment may be implemented without static recompilation of applications 104. In one embodiment, the continuously available execution environment may be implemented without modification of clients 110, and the failover 105 may be transparent to clients 110. The continuously available execution environment may also be used for migration of applications 104 from server to server for maintenance or performance reasons.

In the example shown in FIG. 1, the multi-server networked environment 100 includes a storage device 130A coupled to a network 120. Various embodiments of the multi-server networked environments discussed herein may include various quantities and types of storage devices. Storage devices may include any of various types of storage devices including, but not limited to, storage systems such as RAID (Redundant Array of Independent Disks) systems, disk arrays, JBODs (Just a Bunch Of Disks, used to refer to disks that are not configured according to RAID), and other suitable storage devices.

In various embodiments, the network 120 may comprise any local area network (LAN) such as an intranet or any wide area network (WAN) such as the Internet. The network 120 may use a variety of wired or wireless connection media. Wired connection media may include, for example, Ethernet, Fiber Channel media, or another sufficiently fast connection media. Wireless connection media may include, for example, a satellite link, a modem link through a cellular service, or a wireless link such as Wi-Fi.

In various embodiments, the multi-server networked environment 100 may employ any of a number of commercially available software products for continuous availability, such as, for example, various products available from VERITAS Software Corporation (Mountain View, Calif.). The software products for continuous availability may be installed and executed on servers 102 which are coupled to the network 120. In one embodiment, the software products for continuous availability may operate transparently to the servers 102, and/or applications 104. In various embodiments, the multi-server networked environment 100 may also employ any of a number of commercially available software products for storage management, such as, for example, various products available from VERITAS Software Corporation (Mountain View, Calif.). The storage management software may provide functionality such as cluster management, volume management, storage virtualization, and/or file system management to organize data on one or more storage devices 130 and/or provide storage access to servers 102 and clients 110.

In one embodiment, FIG. 1 may illustrate a Network-Attached Storage (NAS) environment. In a NAS environment, storage devices 130 may be directly attached to a network 120 (such as a local area network) using standard network protocols and may serve files to consumers on the network 120. In one embodiment, FIG. 1 may illustrate a Storage Area Network (SAN) environment. The SAN environment may comprise a dedicated storage network in which servers 102 and subsystems (e.g., switches) collaborate to manage the movement and storage of data on storage devices 130. The hardware (e.g., switches, hubs, bridges, routers, cables, etc.) that connects servers 102 to storage devices 130 in a SAN is referred to as a "disk fabric" or "fabric." In a SAN environment, clients 110 may send data to and receive data from the servers 102 over a local area network instead of communicating directly with the storage devices 130. In one embodiment, FIG. 1 may illustrate a cluster file system environment. A cluster file system may enable concurrent file access to a single storage device 130 from multiple servers 102. Clusters may also provide high availability, load balancing, and/or parallel processing.

In order to capture the application state 103 at a point in time at or immediately prior to the point of failure, sufficient data about the application state 103 may be stored on a routine basis to enable deterministic and transparent restoration of the application state 103. The stored data may include, for example, various combinations of an application snapshot, a file system snapshot, and/or a log of events. FIG. 2 illustrates a multi-server networked environment 200 including failover based on capturing and restoring a file system snapshot, application snapshot, and log of events according to one embodiment. The application state 103C of a first instance 104C (e.g., on a first server 102C) may be preserved and then restored to a second instance 104D (e.g., on a second server 102D) using an application snapshot 132C, file system snapshot 133C, and log(s) 134C. The application snapshot 132C, file system snapshot 133C, and log(s) 134C may be stored on one or more storage devices (e.g., storage device 130B) which are accessible to both servers 102C, 102D.

The application snapshot 132C may comprise application state data such as the execution state, memory state, transaction state, open network connections, open files, and other suitable state-related data for the application instance 104C at a particular point in time. In one embodiment, an application snapshot may be generated at a regular interval (e.g., once per minute). Generation of the application snapshot may comprise freezing all application-related processes, draining I/O queues and buffers, taking a memory snapshot of all application-related processes, taking a memory snapshot of relevant kernel resources (e.g., open files, TCP endpoints, semaphores, etc.), storing the data to disk, and unfreezing the application. Further aspects regarding possible implementations of application snapshots are described in U.S. Pat. No. 6,848,106, which is incorporated herein by reference.

The multi-server networked environment 200 may include an application snapshot/restore framework which processes transactions between the operating system and the applications 104. In one embodiment, application states may be tracked via library and kernel interposition using the application snapshot/restore framework. Requests for system resources or changes to process state may be routed internally, and the application snapshot/restore framework may track these events in anticipation of an application snapshot 132C. The application snapshot/restore framework may be transparent to running (and snapshotted) applications 104 such that an application is always running from the application's perspective. An application snapshot 132C may comprise multiple processes and multiple threads and may include shared resources in use by a process, such as shared memory or semaphores. A process may be snapshotted and restored more than once. In one embodiment, all processes that are snapshotted together in the form of an application chain may share the same application ID ("AID"). As used herein, an application chain is the logical grouping of a set of applications and processes that communicate with each other and share resources to provide a common function.

In one embodiment, a virtual environment may comprise a layer that resides between the applications 104 and the operating system. Resource handles may be abstracted to present a consistent view to the application 104, but the actual system resource handles may change as an application is snapshotted or restored more than once. The virtual environment may also allow multiple applications to compete for the same resources, where exclusion might normally prohibit such behavior, to allow multiple snapshots to coexist without reconfiguration. The virtual environment may comprise a preload library which interposes between an application and the operating system for the purpose of intercepting and handling library calls and system calls. Once the library has been preloaded, it may be attached to the address space of a process. The preload library may operate in "user mode" (i.e., non-kernel and non-privileged mode). Application programming interface (API) calls to modify the state of the application may be made from the application 104 to the operating system API interfaces via the application snapshot/restore framework or the preload library. The preload library may save the state of various resources by intercepting API interface calls and then save the state at a pre-arranged memory location. When the memory of a process is saved as part of the snapshot/restore mechanism, this state may be saved since it resides in memory. The state may be saved to non-volatile storage (i.e., a file on disk). The preload library may notify the snapshot/restore framework through a private interface.

The file system snapshot 133C may comprise file system data or storage data such as contents and metadata of a file system at a particular point in time. The file system snapshot 133C may also be referred to as a "disk snapshot" or "frozen image." The file system represented by the file system snapshot may be used by the application instance 104C, e.g., for storage of application-related data. In one embodiment, a file system snapshot may be generated at a regular interval (e.g., once per minute). In one embodiment, the file system snapshot 133C may represent one or more file system snapshots for a plurality of file systems used by the application instance 104C. In one embodiment, the file system snapshot 133C may include only a relevant subset of any file system used by the application instance 104C, such as one or more specific volumes, directories, and/or files. Further aspects regarding possible implementations of file system snapshots are described in U.S. Pat. No. 6,850,945, which is incorporated herein by reference.

Because snapshots are too resource-intensive to be taken after every event that changes the application state 103C, one or more logs 134C may be used to store data between snapshots which alters the application state 103C. The log(s) 134C may comprise any events that are capable of introducing non-determinism into program execution, including their original sequence and original results. For example, a log 134C may comprise a record of events and results such as transaction requests from clients 110B of the application, interprocess communication events, TCP/IP events, other file I/O, system calls for random number generation, system calls for a date or time, attempts to acquire semaphores, signal execution, etc. In one embodiment, the log(s) 134C may comprise both synchronous and asynchronous events. After restoring the state-related data in the application snapshot 132C and the file system data in the file system snapshot 133C, the entries in the log 134C may be "replayed" (i.e., encountered in the same order and with the same results as originally experienced) to restore the application state 103C and continue execution from the point of failure. In one embodiment, replaying the log entries may comprise ensuring that function calls return the original value, that sequences produce the original result, that read operations return the original results of the original size, that signal execution occurs at the same location as in the original process, that semaphores are acquired in the original sequence, etc. To ensure the original results, replaying some log entries may therefore comprise simulating execution of particular events (e.g., through interception of kernel functions) rather than re-executing the events per se.

Figure 3:
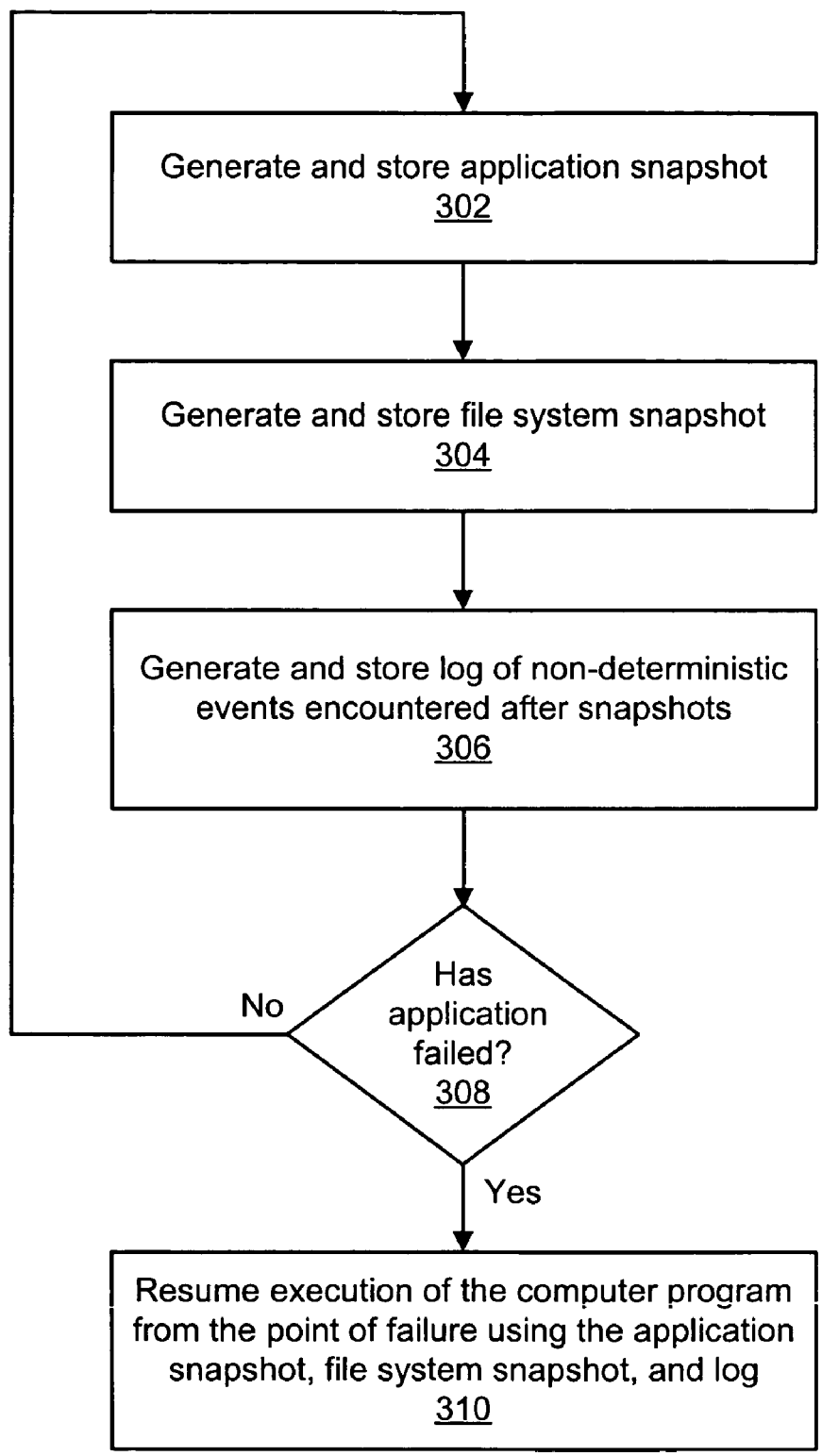
FIG. 3 is a flowchart illustrating a method for failover based on capturing and restoring a file system snapshot, application snapshot, and log of events according to one embodiment.

FIG. 3 is a flowchart illustrating a method for failover based on capturing and restoring a file system snapshot, application snapshot, and log of events according to one embodiment. In one embodiment, any of the steps 302 through 310 may be performed programmatically, i.e., by executing instructions on a computer system to implement the steps. In one embodiment, any of the steps 302 through 310 may be performed automatically, i.e., without user intervention.

In 302, an application snapshot may be generated and stored on a storage device as discussed above with respect to FIG. 2. In 304, a file system snapshot may be generated and stored on a storage device as discussed above with respect to FIG. 2. In 306, an event log may be generated and stored on a storage device as discussed above with respect to FIG. 2. The log may be continuously updated with new events between the generation of snapshots in 302 and 304. In one embodiment, an older application snapshot may be discarded after a new application snapshot is successfully generated and stored. Likewise, an older file system snapshot may be discarded after a new file system snapshot is successfully generated and stored. In one embodiment, an older log may be discarded after a new application snapshot and new file system snapshot are successfully generated and stored.

For purposes of illustration, steps 302 through 306 are depicted in a particular order. In other embodiments, steps 302, 304, and 306 may be performed in a different order than the order depicted in FIG. 3. For example, step 304 may be performed before step 302, or steps 302 and 304 may be performed substantially simultaneously. In one embodiment, steps 302 through 306 may be performed a plurality of times until a failure is detected in 308.

In 308, it may be determined that execution of the computer program 104 has failed on a server 102 at a particular point in time. Failure of the application instance 104 may be caused by a hardware or software fault in the server 102 itself or by a fault in an external entity such as a storage device. In one embodiment, the failure may be sensed automatically by another server 102 using conventional cluster management techniques. The failure may also be sensed by another element such as a client 110, a storage device 130, or another computer system tasked with oversight of the multi-server networked environment.

For purposes of illustration, the failure detection 308 is depicted in FIG. 3 as occurring after step 306. However, the failure detection 308 may occur at substantially any point between steps 302 through 310 in one embodiment. The failure detection 308 may also occur during any of steps 302, 304, or 306. In a common example, the failure may be detected while events are being logged in 306 in between the generation of the snapshots.

In 310, execution of the computer program may be resumed (e.g., on another server) from the particular point in time by restoring the application snapshot, file system snapshot, and log to another instance of the program. Execution of the application 104 may then continue from the point of failure.

The most recent valid application snapshot and the most recent valid file system snapshot may be restored. Restoring the application snapshot may comprise restoring the execution state, memory state, transaction state, open network connections, open files, and other suitable state-related data from the application snapshot to the context of another application instance (e.g., on another server). Restoring the file system snapshot may comprise restoring the contents and metadata of a file system used by the first application instance and captured in the file system snapshot to a storage device accessible to the new application instance. In various embodiments, the file system snapshot may be restored to a same storage device or a different storage device with respect to the location of the original file system. In one embodiment, restoring the file system snapshot may comprise restoring data and metadata to a storage stack comprising the second server, the target storage device, and/or a connectivity layers.

After restoring the snapshots, entries in the log may be replayed in the same order and with the same results as originally encountered to restore the application state 103 deterministically. Replaying the logged events to restore the application state 103 may comprise executing or simulating execution of the events in the same order and with the same results as originally detected and logged. After restoring the snapshots and the log, including the opening of connections to any clients 110, execution of the application 104 may continue in from a point in time at or immediately prior to the point of failure. In this manner, the failover 105 from one server to another server may be transparent to any clients 110. The clients 110B may be unaware of the failover from the first server to the second server, and the clients 110B may take no steps to resume the connections. In this manner, the failover 105 from one server to another server may be transparent to any clients 110.

In one embodiment, network connections between servers 102 and clients 110 may be virtualized through a network virtualization layer. The network virtualization layer may be present on any server 102 involved in the failover process. The network virtualization layer may provide servers with a virtual network address (e.g., a virtual IP address) which is mapped to an actual network address. Using the network virtualization layer, a network connection between a first server and a client may be transferred to and restored on a second server such that the client is unaware that a failover from the first server to the second server has taken place.

In one embodiment, the logged events may include asynchronous events. FIG. 4 illustrates a multi-server networked environment 400 including failover based on logging and replaying asynchronous events 106E according to one embodiment. The application state 103E of a first instance 104E (e.g., on a first server 102E) may be preserved and then restored to a second instance 104F (e.g., on a second server 102F) using a log 134E of asynchronous events 106E. The log 134E of asynchronous events 106E may be stored on one or more storage devices (e.g., storage device 130B) which are accessible to both servers 102E, 102F. The asynchronous events 106E may comprise interactions between the first instance 104E and one or more external programs such as an operating system 107E, other external processes 108E, and/or programs on one or more clients 10C, wherein the interactions are initiated by the external programs. In replaying the asynchronous events 106E for the second instance 104F, the original interactions may be replayed in the same order and with the same results as if they were initiated by an operating system 107F on the second server 102F, other external processes 108F on the second server, or one or more clients 110C. In one embodiment, the external programs (e.g., external processes 108F) may be simulated with respect to the second instance 104F in order to replay the logged events deterministically.

In one embodiment, the asynchronous events 106E may comprise signals received by the application 104. Signals may comprise notifications sent to a process by the operating system or by another process. Each signal is usually represented by a particular integer as well as a symbolic name (e.g., as defined in the file/usr/include/signal.h or another included file). Signals may interrupt whatever the process is doing and require immediate handling. Therefore, when a process receives a signal, a signal handler function appropriate to the particular signal may be called. The signal handler function may be called in "asynchronous mode," in that there is no code in the process that calls the function directly. Instead, when the signal is sent to the process, the operating system may stop the execution of the process and force it to call the signal handler function. When the signal handler function returns, the process continues execution from the point of interruption.

An asynchronous signal is a signal created by an event which occurred outside the process context. As used herein, "logging asynchronous events" may comprise logging the signals and/or the events, the "replaying asynchronous events" may comprise replaying the signals and/or the events. In an embodiment implemented using a Solaris® operating system, the following asynchronous signals may be logged and played back: SIGHUP (hangup), SIGINT (interrupt/ rubout), SIGQUIT (quit), SIGALRM (alarm clock), SIG-TERM (software termination signal from kill), SIGUSR1 (user defined signal 1), SIGUSR2 (user defined signal 2), SIGCLD or SIGCHLD (child status change), SIGURG (urgent socket condition), SIGPOLL (pollable event occurred), SIGCONT (stopped process has been continued; parent process died), SIGVTALRM (virtual timer expired), and SIGLOST (resource lost).

In one embodiment, not all asynchronous signals may be logged and played back. For example, asynchronous signals which are not needed to deterministically restore the application state 103E may be ignored. In an embodiment implemented using a Solaris® operating system, the following asynchronous signals may not be logged or played back: SIGABRT (used by abort), SIGKILL (kill), SIGPWR (power-fail restart), SIGWINCH (terminal window size change), SIGSTOP (stop send by kernel), SIGTSTP (user stop requested from tty), SIGPROF (profiling timer expired), and SIGXCPU (exceeded CPU limit).

A synchronous signal is a signal which is created by a process or thread internally. During playback, it may be expected that a synchronous signal will automatically be generated again by the program code of second instance 104F and delivered at the correct location in the execution of the second instance. Therefore, synchronous signals may not be logged and played back in the same manner as the asynchronous signals in one embodiment. In an embodiment implemented using a Solaris® operating system, the following synchronous signals may not be logged or played back: SIG-ILL (illegal instruction), SIGTRAP (trace trap), SIGEMT (EMT instruction), SIGFPE (floating point exception), SIG-BUS (bus error), SIGSEGV (segmentation violation), SIG-SYS (bad argument to system call), SIGPIPE (write on a pipe with no one to read it), SIGTTIN (background tty read attempted), SIGTTOU (background tty write attempted), SIGXFSZ (exceeded file size limit), SIGWAITING (lwps of process are blocked), SIGLWP (special signal used by thread library), SIGFREEZE (special signal used by CPR), SIGTHAW (special signal used by CPR), and SIGCANCEL (thread cancellation signal used by libthread).

Figure 5:
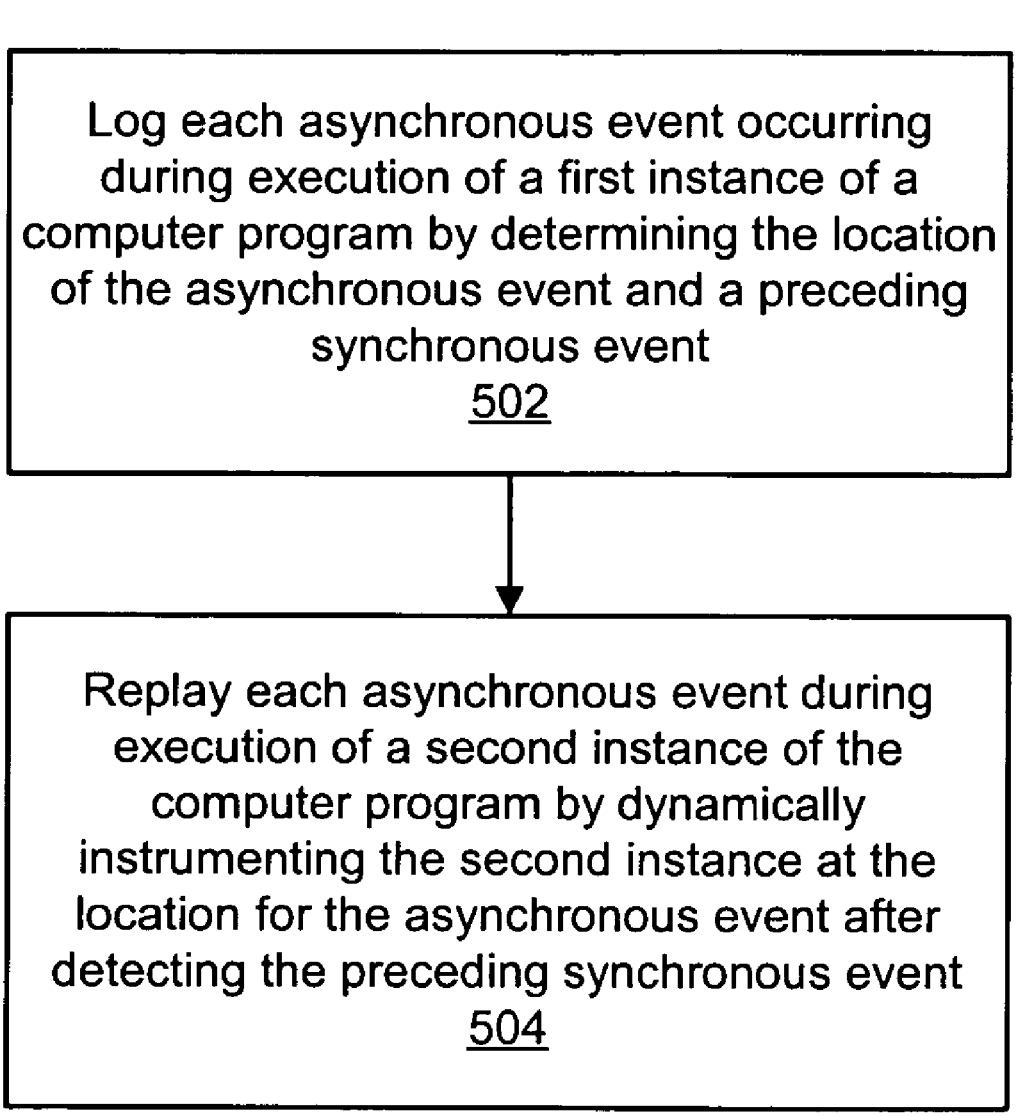
FIG. 5 is a flowchart illustrating a method for logging and replaying asynchronous events according to one embodiment.

FIG. 5 is a flowchart illustrating a method for failover based on logging and replaying asynchronous events according to one embodiment. In 502, one or more asynchronous events occurring during execution of a first instance of a computer program may be logged. As discussed in greater detail below, the logging may comprise determining a respective location in the execution of the first instance at which each of the one or more asynchronous events occurs. In one embodiment, the logging may comprise determining a respective synchronous event preceding each synchronous event. The respective synchronous event may comprise a nearest synchronous event preceding the location at which the asynchronous event occurs in the execution of the first instance.

In 504, the one or more asynchronous events may be replayed during execution of a second instance of the computer program. As discussed in greater detail below, the replaying may comprise instrumenting the second instance (such as by inserting breakpoints) in the vicinity of the respective locations during the execution of the second instance. In one embodiment, the second instance may be instrumented at the respective location for each asynchronous event after detecting the respective synchronous event preceding the asynchronous event in the execution of the second instance. As used herein, the terms "instrumenting" and "instrumentation" refer to techniques of modifying a computer program (e.g., by installing additional logic) to monitor execution of the program. The instrumentation may occur dynamically (i.e., during execution of the second instance of the computer program), programmatically (i.e., by executing instructions on a computer system), and automatically (i.e., without user intervention). The instrumentation may also occur transparently (i.e., in a manner invisible to the application developer and user). In one embodiment, logging and playback may be performed in the kernel, such as by using a loadable kernel module. In one embodiment, ioctl messages may be used for communication between the application and a module used for logging and/or playback.

In one embodiment, key parameters associated with asynchronous events may be logged in 502 along with the events themselves during execution of a program. The logged parameters may indicate a location in the execution of the program at which to replay an asynchronous event. In one embodiment, the logged parameters may include a set of context values such as an application program counter when the event occurred, a quantity of instructions executed by the application since the last synchronous event occurred, the register contents at the time of the event, the stack frame(s) at the time of the event, and/or other suitable indicators of execution context. In one embodiment, a measurement of execution time and/or context between the most recent synchronous event and the time and/or context of the current asynchronous event may be logged. In one embodiment, substantially any measurement of execution time and context as provided by the operating system 107E and server CPU may be used. In one embodiment, a user process execution time between the most recent synchronous event and the current asynchronous event may be logged. In one embodiment, performance counters may be used to determine the exact context of an asynchronous event in program execution. Performance counters may be provided, for example, by various members of the Sparc® CPU family such as Sparc Ultra III CPUs.

In one embodiment, logging may include determining whether the asynchronous signal was detected and delivered during system call execution in addition to determining the context values. In one embodiment, a function may be used which modifies the user process stack such that the signal handler is executed after control returns to the user process. In the Solaris® operating system, for example, the psig( ) function may be used to modify the process stack frame if a signal is pending for the current process. In one embodiment, to efficiently log signals in the correct order, a signal handler context may be logged by intercepting a kernel function. In the Solaris® operating system, for example, the intercepted function may be the function sendsig( ) or sendsig32( ) (for 32-bit applications). Within the function, a pointer to the user process registers may be obtained (e.g., using the kernel function lwptoregs( )) so that the context may be determined. In one embodiment, a kernel function may be intercepted by replacing all calls to the intercepted function with a different call address. In another embodiment, a kernel function may be intercepted by replacing the initial instruction(s) of the called function to cause execution elsewhere.

In one embodiment, a signal may be handled by interrupting a system call as follows. First, the system call occurs. The operating system may then determine if a signal is pending. If so, and if signal handling is enabled, then the signal handler may be pushed onto the process stack. The system call handler may sets the errno variable to EINTR and prepare a return value to match the error condition. Control may then be passed to the user process, and the signal handler may be executed. After the signal handler has completed execution, control may be passed back to the user process to the system call return address, with errno set to EINTR and the return value indicating an error condition.

For playback of the above sequence, system calls which are about to return EINTR may be logged. Thus, each system call which can return EINTR may be intercepted in the execution of the first instance. Upon system call completion, any returned error may be checked for EINTR. If EINTR is seen as return value, the system call context from user process perspective may be logged. Some system calls (e.g., read(2) and write(2),) may not always return EINTR when interrupted. If some data was already read, the system call may instead return the number of bytes read, and no error condition may be reported. The signal may, however, still be delivered upon return from the system call. In this case, the signal may be handled as if it occurred outside system call context, or EINTR may not be exclusively used to detect whether a system call was interrupted by a signal.

In restoring the application state 103E to a second instance 104F, synchronous and asynchronous events may be replayed in the original order of occurrence. In one embodiment, the second instance of the computer program may be separated into a plurality of execution blocks, wherein the execution blocks are separated from one another by one or more synchronous events, such as system calls. Each execution block may therefore comprise one or more asynchronous events. Each bounding synchronous event may serve as a synchronization point, and both the quantity of system calls since the previous snapshot and the number of the most recent system call may be logged to assist in determining a context in which an asynchronous signal is played back. When the synchronous event most nearly preceding an asynchronous event is encountered in the replay, the program code of the second instance (e.g., the particular execution block) may be instrumented for replay of the asynchronous event at the same location in program execution as in the first instance. As discussed in greater detail below, the details of the instrumentation may vary according to the nature of the asynchronous events and/or the platform (e.g., the specific CPU, specific operating system 107F, etc.) of the second server 102F.

In some situations, asynchronous events may not directly interfere with synchronous program execution. For example, a signal indicating that a child process has died will typically not interfere with normal process behavior. Under such conditions, asynchronous events may be replayed any time after the prior synchronous event was replayed. The second instance may be instrumented to perform such "inexact" replay by stopping the second instance after execution of the synchronous event most nearly preceding an asynchronous event (e.g., upon return from a system call) and inserting the asynchronous event (i.e., the asynchronous signal) into the process context at that location.

In other situations, replay of asynchronous events may occur at exactly the same location as in the original program execution. To perform this "exact" replay, the second instance may be instrumented by inserting a breakpoint after the synchronous event most nearly preceding the asynchronous event. The breakpoint may be based on a value of a program counter at which the event originally occurred, a value of an instruction counter at which the event originally occurred (if supported by the target CPU), or on another suitable value. Each time the second instance stops at the breakpoint, then the logged parameters associated with the original occurrence of the asynchronous event (e.g., the register values, stack frame(s), application program counter if available, quantity of instructions if available, etc.) are compared against the relevant parameters currently seen at the breakpoint. If the values match, then trace points are removed and the application's appropriate signal handler is called. In this manner, asynchronous signals may be replayed in the same locations as in the first instance while substantially avoiding the performance penalties of static instrumentation.

In one embodiment, the performance penalties of instrumentation may be further reduced by transitioning into a "pre-breakpoint" state after the synchronous playback context is found. In the pre-breakpoint state, the progress of the second instance application may be closely monitored, either in respect to its execution time or by monitoring performance counter events (e.g., the number of instructions executed or number of branches taken). The implementation of this monitoring may vary according to the capabilities of the target platform. For example, if an instruction counter trap is available in the target CPU, the instruction counter trap may be used to trap at the exact target context if the instruction counter is accurate or in its vicinity if it is inaccurate.

If a CPU implements performance counters and a performance counter overflow interrupt (such as the Sparc V9, for example), then a suitable performance counter may be pre-initialized such that it overflows just before the target context match is expected to take place. The interrupt may then occur only a few instructions before the context match. This interrupt may be used to set a breakpoint into the application code at the target context. An interrupt is asynchronous to program execution and may not occur at the exact target location in the program, even if the performance counter is accurate. If performance counters are not available, the process (user) execution time may be monitored whenever the system transitions into kernel mode (e.g., with each timer tick). If the CPU supports performance counters but does not support performance counter overflow interrupts, a combination of both methods may be used by monitoring performance counter values.

Figure 6:
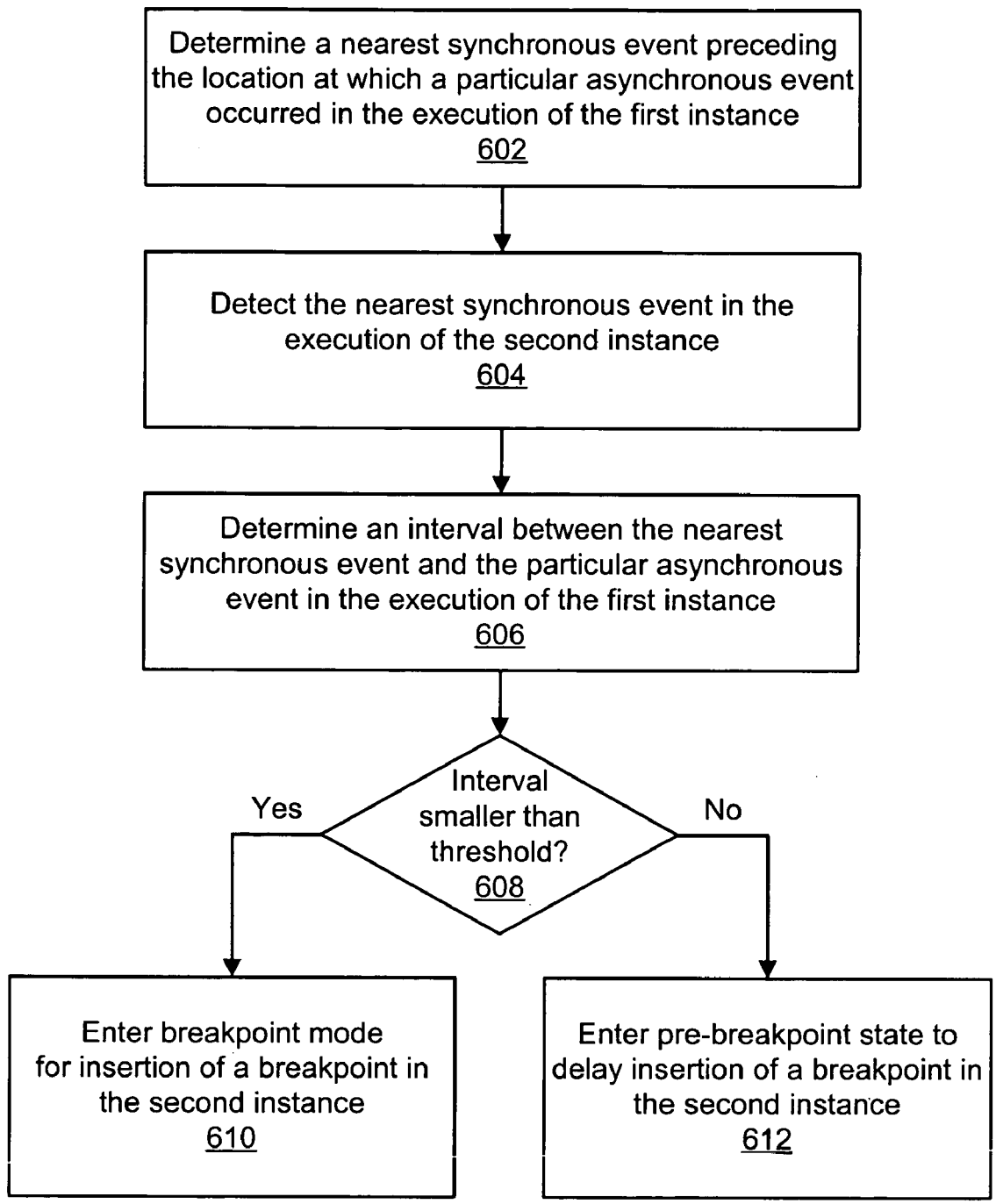
FIG. 6 is a flowchart illustrating a method for replaying asynchronous events according to one embodiment.

FIG. 6 is a flowchart illustrating a method for replaying asynchronous events according to one embodiment. In 602, a nearest synchronous event preceding the location at which a particular asynchronous event occurred in the execution of the first instance may be determined. The nearest synchronous event may be detected in the execution of the second instance in 604. In 606, an interval between the nearest synchronous event and the particular asynchronous event in the execution of the first instance may also be determined. The interval may comprise a suitable measure of time or a measure of program execution such as how many clock ticks, instructions, or performance counter events occurred between the nearest synchronous event and the particular asynchronous event. In one embodiment, step 606 may be performed prior to step 604.

It may be determined if the interval is smaller than a threshold in 608. The threshold may be pre-defined. Depending upon the nature of the interval (i.e., whether the interval is measured in milliseconds, instructions, etc.), the threshold may comprise an appropriate value such as 1 millisecond, 100 instructions, or 10 branches. To mitigate any performance penalties from repeatedly encountering a breakpoint while remaining in a breakpoint mode, the threshold may be defined as an appropriately small value. If the interval is smaller than the threshold, then the breakpoint mode may be entered in the second instance in 610. The breakpoint mode is further discussed with reference to FIG. 7. If the interval is not smaller than the threshold, the pre-breakpoint state may be entered in 612 to delay insertion of the breakpoint in the second instance. The pre-breakpoint state is further discussed with reference to FIG. 8.

Figure 7:
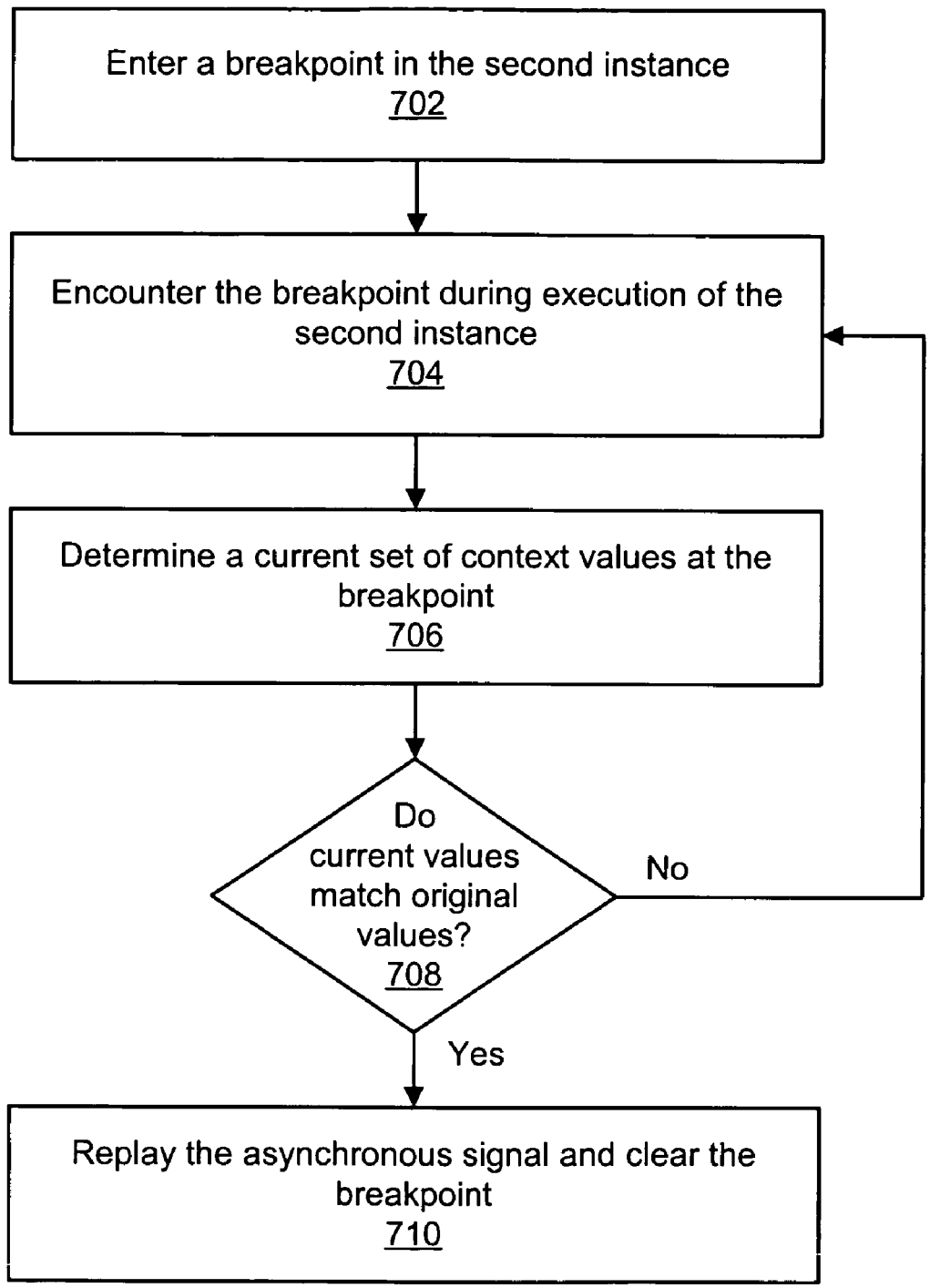
FIG. 7 is a flowchart illustrating a method for replaying asynchronous events using a breakpoint mode according to one embodiment.

FIG. 7 is a flowchart illustrating a method for replaying asynchronous events using a breakpoint mode according to one embodiment. As discussed with reference to FIG. 6, the breakpoint mode may be entered if the asynchronous event is sufficiently near in program execution to make acceptable any performance penalties of the breakpoint mode. In 702, a breakpoint is entered at the current location in the execution of the second instance. In one embodiment, a custom trap and trap handler may be used to set breakpoints. Alternatively, existing techniques may be used, thereby causing the kernel to issue a SIGTRAP signal to the user process. In one embodiment, the target application may be stopped before the breakpoint is set. After setting the breakpoint, execution of the second instance may proceed.

Each time the breakpoint is encountered in 704, a current set of context values may be determined in 706. Each member of the current set of context values may correspond to a member of the original set of context values logged at the occurrence of the asynchronous event in the first instance. The current set of context values may be compared to the original set of context values in 708. If the two sets of values match, then the asynchronous signal is replayed (e.g., by calling an appropriate signal handler function) and the breakpoint is cleared in 710. If the two sets of values do not match, then the execution of the second instance continues in breakpoint mode. In one embodiment, if a breakpoint cannot be set (e.g., due to configuration constraints), the target application may be executed step by step until the execution context of the asynchronous event is found.

Figure 8:
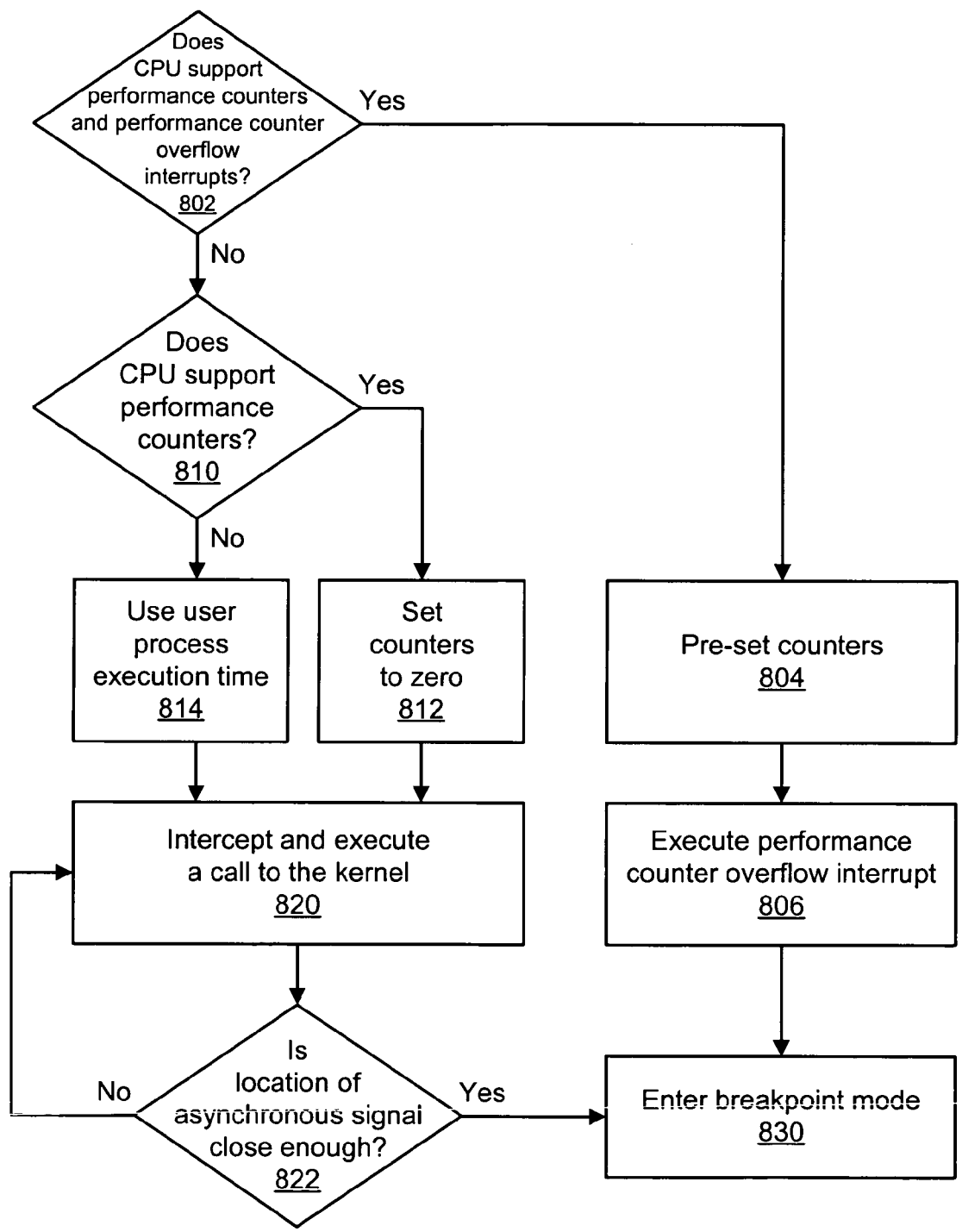
FIG. 8 is a flowchart illustrating a method for replaying asynchronous events using a pre-breakpoint state according to one embodiment.

FIG. 8 is a flowchart illustrating a method for replaying asynchronous events using a pre-breakpoint state according to one embodiment. In 802, it is determined whether the target CPU on the second server supports reliable performance counters and performance counter overflow interrupts. If so, then in 804 the counters are pre-set such that an overflow interrupt occurs in 806 at the target context less a well defined threshold. In one embodiment, the well defined threshold is the same threshold discussed with reference to FIG. 6. The breakpoint mode, as discussed with reference to FIG. 7, may then be entered in 830.

In 810, it is determined whether the target CPU supports reliable performance counters (but not performance counter overflow interrupts), e.g., for anticipating a location of an asynchronous event in the replay of the program. If so, then in 812 the performance counter(s) are reset to zero. If the target CPU does not support performance counters, it is determined in 814 to use the user process execution time from the synchronous event to the original asynchronous signal execution for anticipating the location of the asynchronous event. Also in 814, CPU speed differences or other configuration differences between the first server and the second server may be taken into account. Calls into the kernel, such as traps, may then be intercepted and executed starting in 820. Each time such an intercepted call is executed, it is determined in 822 (using the performance counter(s) or user process execution time) whether the location of the asynchronous signal as originally executed is close enough in the current execution. If the location is close enough (i.e., within a pre-defined tolerance), then the breakpoint mode, as discussed with reference to FIG. 7, may be entered in 830.

As discussed above, the application state of a first instance may be deterministically restored to a second instance of the application by efficiently replaying the execution of the first instance of the application. In some embodiments, it may be necessary to instrument or otherwise modify a process associated with the second instance of the application such that the process executes in a desired manner, e.g., in this case, replaying the associated process of the first instance deterministically. In one embodiment, the process may be modified from substantially any kernel state in which the kernel determines that such modification is necessary. In one embodiment, the process may be modified such that delays are minimized or substantially eliminated after a determination to modify the process is made.

FIG. 9 illustrates a computer system 1000 including modification of a process according to one embodiment. Computer system 1000 comprises memory 1010 and processor 1050, and within memory 1010, a kernel 1020, process context 1030 and process memory 1040. Note that computer system 1000 may represent a computer server such as 102 or various other computer systems such as client 110. An application executing on the computer system 1000 may comprise one or more processes such as the process associated with the process context 1030 and process memory 1040. Each process may further include one or more threads. The memory modification system and method discussed herein may be applicable to an application, process, or thread.

The process context 1030 may comprise an application state characterized by various elements of application state data as discussed with reference to FIG. 2. The process memory 1040 may comprise memory associated with and/or controlled by the process. The process memory 1040 may comprise program instructions 1045 which, when executed by the processor 1050, implement the process. The process memory 1040 may comprise, for example, user space memory pages. In one embodiment, the process context 1030 may include the process memory 1040.

In some embodiments, modifying the process may include modifying the process context 1030, process memory 1040, and/or program instructions 1045 as further discussed with reference to FIG. 10. In modifying the process memory 1040, it may be desirable for the kernel 1020 to wait. It may also be desirable for the kernel to accept interruptions, e.g., page fault traps. In some instances, the kernel 1020 may not be in such a state. For example, the kernel 1020 may already be in the process of handling a page fault trap for a currently running process. In one embodiment, the kernel may be in a CPU interrupt state in which modification of the process memory 1030 is not directly possible.

Figure 10:
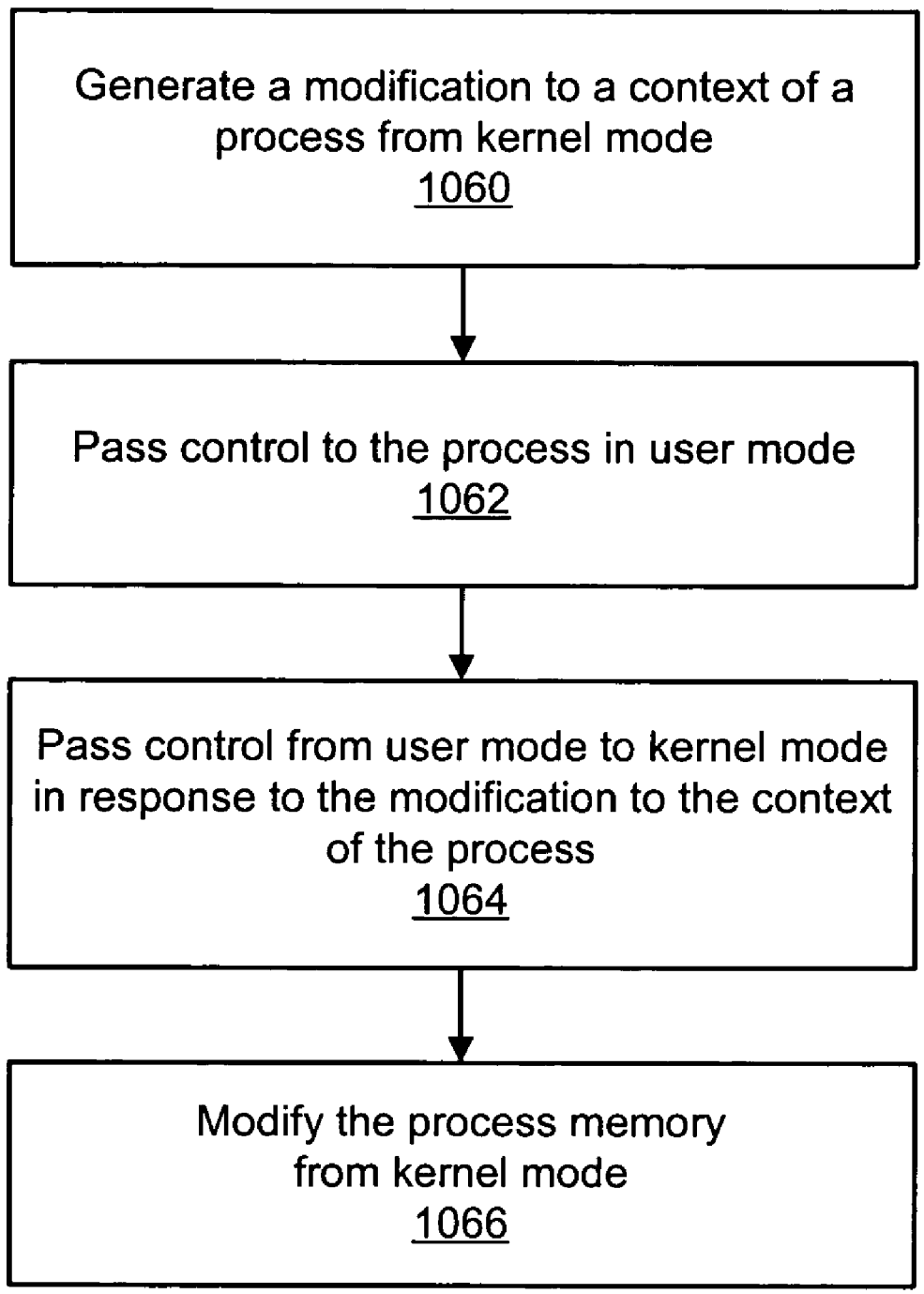
FIG. 10 is a flowchart illustrating a method for context and memory modification of a process according to one embodiment.

FIG. 10 is a flowchart illustrating a method for memory and context modification of a process from kernel mode according to one embodiment. It should be noted that in various embodiments, some of the method elements may be performed concurrently, in a different order than shown, or omitted. Additional method elements may also be performed.

In some embodiments, when kernel 1020 detects a condition in which modification of the process memory 1040 is desired, but the kernel cannot currently wait or modify the process memory 1040, it may generate a modification 1032 to the process context 1030 as shown in 1060. Note that the process context may include elements within the process memory 1040 and the program instructions 1045. Note further that in some embodiments, other modifications with similar results to those described hereinbelow are envisioned. The context modification 1032 may be generated from kernel mode, e.g., by the kernel 1020, a kernel-loadable module, or any other component executing in kernel mode. In various embodiments, the context modification 1032 may include setting a thread program counter to an invalid address, setting the thread processor state to a single step mode (if supported by the CPU), and/or any other suitable modification resulting in the process trapping into kernel context.

The kernel code may continue to execute in its current state and/or environment after generating the context modification 1032. Eventually, in 1062, control may be passed back to user mode for further execution of the process. In 1064, the context modification 1032 may subsequently cause control to be passed back to the kernel 1020 in kernel mode such that delays in user mode are minimized or substantially eliminated. In some embodiments, a known number of instructions may execute in user mode before the transition back to kernel mode in 1064. In some embodiments, the number of executed instructions while in user mode may be zero, i.e., the transition back to kernel mode may occur substantially immediately. For example, zero instructions may be executed in user mode if the context modification 1032 included setting the thread program counter to an invalid address. Alternatively, if the context modification 1032 included setting the thread processor state to single step mode, then a single instruction may be executed in user mode.

In this new state, the kernel 1020 may safely manipulate the process as illustrated in FIG. 9 via the memory modification 1034. In some embodiments, the kernel 1020 or controlling kernel module may perform substantially any desired activity or manipulation to the process memory 1040. For example, the kernel 1020 may insert a breakpoint into the program instructions 1045 for the desirable reasons disclosed hereinabove. The kernel 1020 may also modify values of variables or memory addresses such that playback of the instance is executed deterministically. Note that modifications are not limited to those listed hereinabove, and, in fact, further modifications are envisioned.

In some embodiments, after modification of the process, the kernel or other controlling process may restore the original user context (in the example hereinabove, the original program counter value) and clear the result of the context manipulation (e.g., the fault trap caused by setting the program counter to an invalid value) and return the process to user-mode. Thus, the method illustrated in FIG. 10 may transform an asynchronous event (such as a high priority interrupt) into a thread-synchronous event (i.e., an event which cannot be blocked by the recipient). Additionally, an arbitrary kernel state (such as page fault handling) may be transformed into a kernel state in which user process memory may be easily manipulated, without prior knowledge of the kernel state, i.e., such that no detection or triggering pertaining to the kernel state is required.

Exemplary Computer Systems

Figure 11:
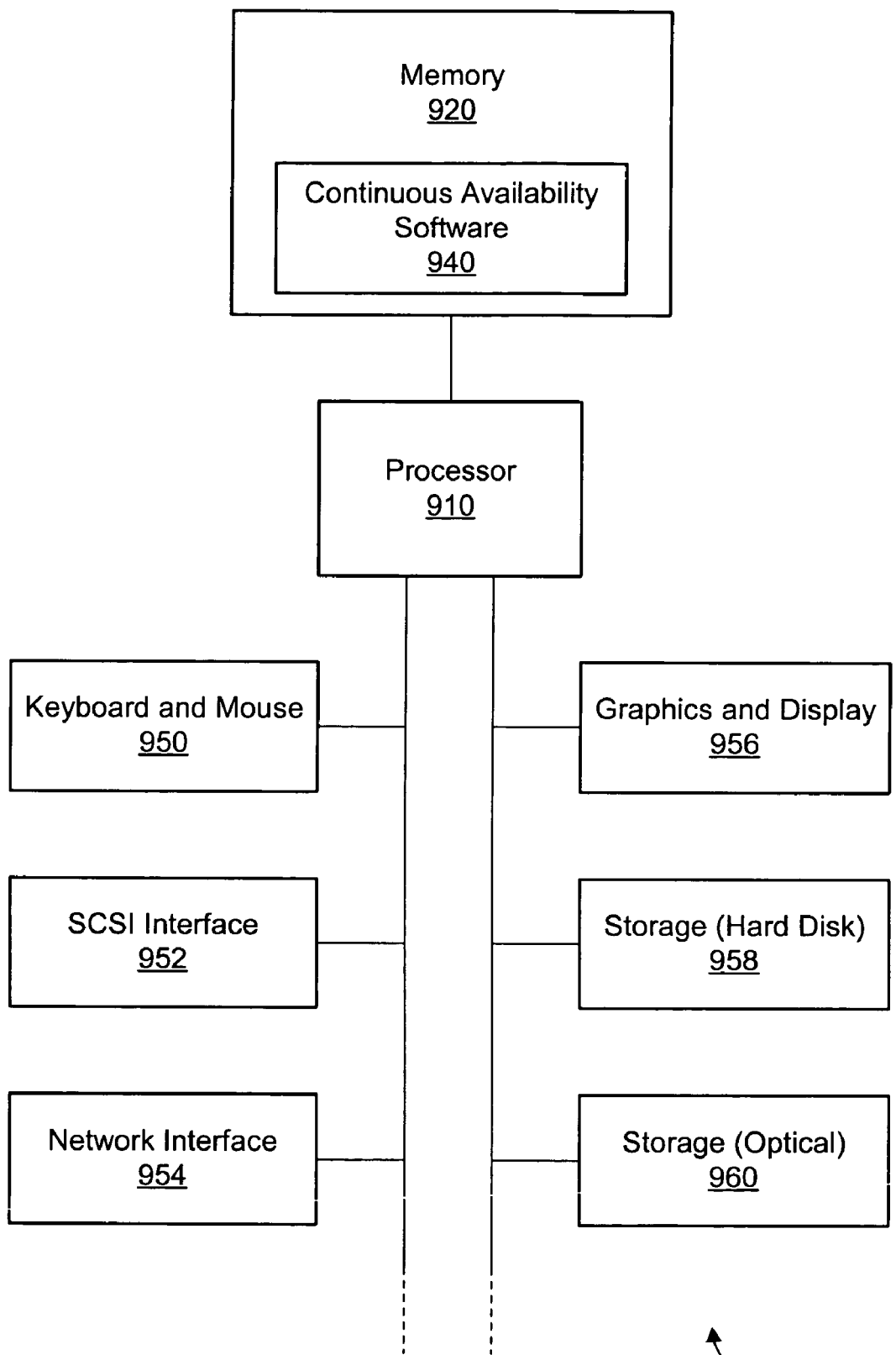
FIG. 11 illustrates a block diagram of a typical computer system for implementing embodiments of the systems and methods described above.

FIG. 11 illustrates a block diagram of a typical computer system 900 for implementing embodiments of the systems and methods described above for event playback synchronization. Computer system 900 may be illustrative of a server 102, client 110, or storage device 130. As used herein, "computing device" is synonymous with "computer system." Computer system 900 includes a processor 910 and a memory 920 coupled by a communications bus. Processor 910 can be a single processor or a number of individual processors working together. Memory 920 is typically random access memory (RAM), or some other dynamic storage device, and is capable of storing instructions to be executed by the processor, e.g., continuous availability software 940. Memory 920 is also used for storing temporary variables or other intermediate information during the execution of instructions by the processor 910.

Computer system 900 may also include devices such as keyboard & mouse 950, SCSI interface 952, network interface 954, graphics & display 956, hard disk 958, and other nonvolatile storage 960, all of which are coupled to processor 910 by a communications bus. In various embodiments, nonvolatile storage 960 may include optical media devices such as read-only or writable CD or DVD, solid-state devices such as nonvolatile RAM, or any other suitable type of nonvolatile storage. It will be apparent to those having ordinary skill in the art that computer system 900 can also include numerous elements not shown in the figure, such as additional storage devices, communications devices, input devices, and output devices, as illustrated by the ellipsis shown. An example of such an additional computer system device is a Fibre Channel interface.

Those having ordinary skill in the art will readily recognize that the techniques and methods discussed above can be implemented in software as one or more software programs, using a variety of computer languages, including, for example, traditional computer languages such as assembly language, Pascal, and C; object oriented languages such as C++ and Java; and scripting languages such as Perl and Tcl/Tk. In some embodiments, software 940 may comprise program instructions executable, for example by one or more processors 910, to perform any of the functions or methods described above. Also, in some embodiments software 940 can be provided to the computer system via a variety of computer-accessible media including electronic media (e.g., flash memory), magnetic storage media (e.g., hard disk 958, a floppy disk, etc.), optical storage media (e.g., CD-ROM 960), and communications media conveying signals encoding the instructions (e.g., via a network coupled to network interface 954). In some embodiments, separate instances of these programs can be executed on separate computer systems in keeping with the methods described above. Thus, although certain steps have been described as being performed by certain devices, software programs, processes, or entities, this need not be the case and a variety of alternative implementations will be understood by those having ordinary skill in the art.

Additionally, those having ordinary skill in the art will readily recognize that the techniques described above can be utilized in a variety of different storage devices and computer systems with variations in, for example, the number of nodes, the type of operation of the computer system, e.g., cluster operation (failover, parallel, etc.), the number and type of shared data resources, and the number of paths between nodes and shared data resources.

Various modifications and changes may be made to the invention as would be obvious to a person skilled in the art having the benefit of this disclosure. It is intended that the following claims be interpreted to embrace all such modifications and changes and, accordingly, the specifications and drawings are to be regarded in an illustrative rather than a restrictive sense.

What is claimed is:

1. A method for modifying a process memory for a process executing in user mode, the method comprising:
   generating a modification to a context of the process from kernel mode;
   passing control to the process in user mode after generating the modification to the context of the process;
   passing control from user mode to kernel mode in response to the modification to the context of the process; and
   modifying the process memory from kernel mode after passing control from user mode to kernel mode.

2. The method of claim 1,
   wherein control is passed to the process in user mode and back to kernel mode without executing an instruction in user mode.

3. The method of claim 1,
   wherein modifying the process memory comprises setting a breakpoint in the process.

4. The method of claim 1,
   wherein generating the modification to the context of the process comprises setting a program counter to point to an invalid address.

5. The method of claim 1,
   wherein the modification to the context of the process is generated from kernel mode in a CPU interrupt state.

6. The method of claim 1,
   wherein the modification to the context of the process is generated from kernel mode in an arbitrary kernel state.

7. The method of claim 1,
   restoring the context of the process after modifying the process memory by undoing the modification to the context of the process.

8. A system comprising:
   a processor; and
   a memory coupled to the processor, wherein the memory comprises a process memory for a process executing in user mode, and wherein the memory stores program instructions which are executable by the processor to:
   generate a modification to a context of the process from kernel mode;
   pass control to the process in user mode after generating the modification to the context of the process;
   pass control from user mode to kernel mode in response to the modification to the context of the process; and
   modify the process memory from kernel mode after passing control from user mode to kernel mode.

9. The system of claim 8,
   wherein control is passed to the process in user mode and back to kernel mode without executing an instruction in user mode.

10. The system of claim 8,
    wherein, in modifying the process memory, the program instructions are further executable by the processor to set a breakpoint in the process.

11. The system of claim 8,
    wherein, in generating the modification to the context of the process, the program instructions are further executable by the processor to set a program counter to point to an invalid address.

12. The system of claim 8,
    wherein the modification to the context of the process is generated from kernel mode in a CPU interrupt state.

13. The system of claim 8,
    wherein the modification to the context of the process is generated from kernel mode in an arbitrary kernel state.

14. A computer-accessible memory medium comprising program instructions for modifying a process memory for a process executing in user mode, wherein the program instructions are computer-executable to implement:
    generating a modification to a context of the process from kernel mode;
    passing control to the process in user mode after generating the modification to the context of the process;
    passing control from user mode to kernel mode in response to the modification to the context of the process; and
    modifying the process memory from kernel mode after passing control from user mode to kernel mode.

15. The computer-accessible memory medium of claim 14,
    wherein control is passed to the process in user mode and back to kernel mode without executing an instruction in user mode.

16. The computer-accessible memory medium of claim 14,
    wherein modifying the process memory comprises setting a breakpoint in the process.

17. The computer-accessible memory medium of claim 14,
    wherein generating the modification to the context of the process comprises setting a program counter to point to an invalid address.

18. The computer-accessible memory medium of claim 14,
    wherein the modification to the context of the process is generated from kernel mode in a CPU interrupt state.

19. The computer-accessible memory medium of claim 14,
    wherein the modification to the context of the process is generated from kernel mode in an arbitrary kernel state.

20. A system for modifying a process memory for a process executing in user mode, the system comprising:
    means for generating a modification to a context of the process from kernel mode;
    means for passing control to the process in user mode after generating the modification to the context of the process;
    means for passing control from user mode to kernel mode in response to the modification to the context of the process; and
    means for modifying the process memory from kernel mode after passing control from user mode to kernel mode.

* * * * *